(12) United States Patent
Fujiwara

(10) Patent No.: US 8,230,243 B2
(45) Date of Patent: Jul. 24, 2012

(54) INFORMATION PROCESSING APPARATUS

(75) Inventor: Naoki Fujiwara, Akiruno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 67 days.

(21) Appl. No.: 12/950,647

(22) Filed: Nov. 19, 2010

(65) Prior Publication Data
US 2011/0161694 A1    Jun. 30, 2011

(30) Foreign Application Priority Data
Dec. 24, 2009    (JP) .................................. 2009-293271

(51) Int. Cl.
*G06F 1/00* (2006.01)
*G06F 1/32* (2006.01)
(52) U.S. Cl. ........................................ 713/310; 713/320
(58) Field of Classification Search .................. 713/310, 713/320, 324
See application file for complete search history.

(56) References Cited

U.S. PATENT DOCUMENTS

| | | | |
|---|---|---|---|
| 6,662,301 B1 | 12/2003 | Sekine et al. | |
| 6,774,604 B2 * | 8/2004 | Matsuda et al. | 320/110 |
| 7,000,129 B2 | 2/2006 | Sekine et al. | |
| 7,193,442 B2 * | 3/2007 | Zhu | 326/82 |
| 7,395,442 B2 | 7/2008 | Sekine et al. | |
| 7,489,974 B2 | 2/2009 | Numano | |
| 7,945,796 B2 | 5/2011 | Fujiwara | |
| 7,987,376 B2 * | 7/2011 | Inoue et al. | 713/300 |
| 2004/0073819 A1 | 4/2004 | Sekine et al. | |
| 2006/0015759 A1 | 1/2006 | Sekine et al. | |
| 2006/0035527 A1 | 2/2006 | Numano | |
| 2007/0136617 A1 * | 6/2007 | Kanno et al. | 713/320 |
| 2008/0313477 A1 | 12/2008 | Numano | |
| 2009/0006874 A1 | 1/2009 | Fujiwara | |
| 2009/0200982 A1 * | 8/2009 | Hurtz | 320/103 |
| 2010/0115147 A1 * | 5/2010 | Kim | 710/14 |
| 2011/0047393 A1 * | 2/2011 | Tracy et al. | 713/300 |
| 2011/0060850 A1 * | 3/2011 | Ko et al. | 710/15 |

FOREIGN PATENT DOCUMENTS

| | | |
|---|---|---|
| JP | 2001-067156 A | 3/2001 |
| JP | 2006-053748 A | 2/2006 |
| JP | 2008-009898 A | 1/2008 |
| JP | 2009-009532 | 1/2009 |
| JP | 2011-008673 | 1/2011 |
| WO | WO 2009/031235 | 3/2009 |

OTHER PUBLICATIONS

Notice of Reasons for Rejection mailed by the Japan Patent Office on May 10, 2011 in corresponding Japanese application No. 2009-293271 in 8 pages.

* cited by examiner

*Primary Examiner* — Thomas Lee
*Assistant Examiner* — Phil Nguyen
(74) *Attorney, Agent, or Firm* — Knobbe, Martens, Olson & Bear LLP

(57) ABSTRACT

According to one embodiment, an information processing apparatus includes a device controller, an operation mode switching circuit, a line switch, and a controller. The device controller includes a wakeup function and performs transmission with the external device through a data line. The operation mode switching circuit changes an operation mode of a sleep-and-charge function and performs transmission with the external device through the data line. The line switch selectively connects the data line with either of the device controller or the operation mode switching circuit. The controller controls a power supply to the device controller and a drive of the operation mode switching circuit and the line switch in accordance with the condition of the main body.

5 Claims, 5 Drawing Sheets

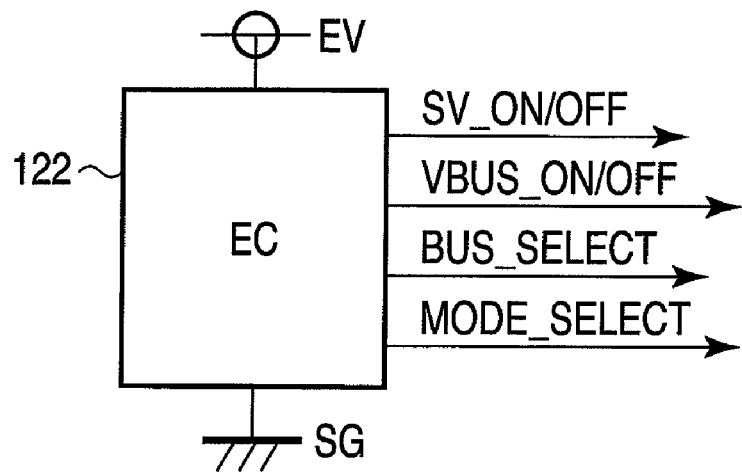
F I G. 4
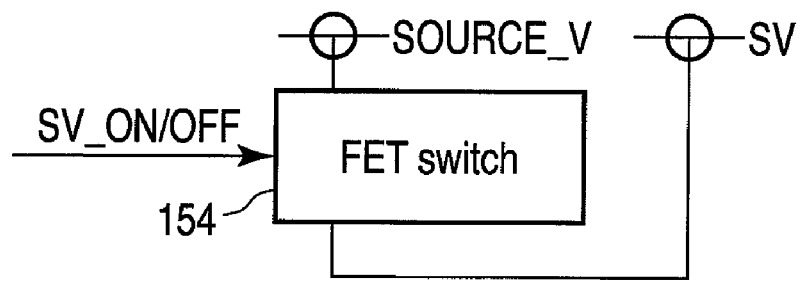
F I G. 5

| ACPI Sleep State | External USB port function | | BUS_SELECT | SV | VBUS | SOURCE_V | EV | Remarks |
|---|---|---|---|---|---|---|---|---|
| | Full-time supply | Wake Up | | | | | | |
| S0 (On) | — | — | USB | ON | ON | ON | | (1) |
| S3 (Standby) | ON | OFF | Full-time supply | ON | ON | ON | ON | (7) |
| | | | | | OFF | | | (2) |
| | OFF | ON | USB | | ON | | | (5) |
| S4 (Hibernation) | ON | OFF | Full-time supply | OFF | ON | ON | ON | (8) |
| | | | | | OFF | OFF | | (3) |
| | OFF | ON | USB | | ON | | | (6) |
| S5 (Shutdown) | ON | OFF | Full-time supply | OFF | ON | ON | ON | (9) |
| | | | | | OFF | OFF | | (4) |
| | OFF | ON | USB | | ON | | | (10) |

F I G. 6

INFORMATION PROCESSING APPARATUS

CROSS-REFERENCE TO RELATED APPLICATIONS

This application is based upon and claims the benefit of priority from Japanese Patent Application No. 2009-293271, filed Dec. 24, 2009; the entire contents of which are incorporated herein by reference.

BACKGROUND

1. Field

Embodiments described herein relate generally to a power saving control technique in a personal computer including a function of always supplying power to an external device connected by means of a Universal Serial Bus (USB) connector.

2. Related Art

In recent years, notebook and desktop personal computers have come into widespread use as tools providing various functions such as sending and receiving electronic mail (e-mail) over the Internet, browsing publically available information on the World Wide Web, and creating documents. These kinds of personal computer include various connectors for connecting external devices as the need arises.

For example, a USB connector is provided with a contact for a data line and a contact for a power supply line. Therefore, power is supplied from the personal computer, and thereby, an external device is operable.

Recently, mobile devices individually operable by a battery, such as portable music players and cellular phones, have come into widespread use. Many of these mobile devices are configured so that they are connectable to a USB connector for data exchange with a personal computer. These mobile devices configured to be connectable to a USB connector are mostly operable by power from the personal computer (without consuming their own battery). Further, the batteries of the foregoing mobile devices are mostly chargeable by power from the personal computer.

Moreover, a personal computer is widely used to connect a mobile device to a USB connector for the purpose of charging the battery of a mobile device. The foregoing use has attracted interests, and thus, the following personal computer has been proposed (e.g., see Jpn. Pat. Appln. KOKAI Publication No. 2006-53748). The personal computer is capable of always supplying power to a mobile device connected to a USB connector without turning on power, that is, in the power-off state.

A personal computer is capable of taking the following three states as a power-off state. One is a standby state of continuing the supply to a main memory and continuing to hold a work interruption state in a power-off state. Another is a hibernation state of migrating the content of a main memory to a hard disk drive (HDD) and stopping the supply to the main memory. Another is a shutdown state of abandoning the content of a main memory and stopping all supply. The foregoing three mode power-off states are expressed as "S3", "S4" and "S5" to make a distinction between these three states according to Advanced Configuration and Power Interface (ACPI). In this case, a power-on state is expressed as "S0".

A recent personal computer is required to support a wakeup function when being in a standby state. According to the wakeup function, when receiving a wakeup signal from an external device connected to a USB connector, the personal computer automatically returns to a power-on state. Therefore, the supply to a controller (i.e., USB host controller) for controlling an exchange with an external device connected to a USB connector must be continued when a personal computer is in a standby state even if it is in a power-off state. In other words, if the personal computer is in a hibernation state or shutdown state, it is possible to stop the supply to a USB host controller.

On the other hand, users connect an external device to a USB connector of a personal computer being in a power-off state to charge a battery. In this case, they do not recognize the difference between a standby state, a hibernation state and a shutdown state. Thus, in a power-off state, the personal computer supports a function of always supplying power to an external device connected to a USB connector (hereinafter, referred to as a sleep-and-charge function). In this case, the computer must continue the supply to a USB host controller in a hibernation state or a shutdown state.

For example, a notebook personal computer includes various designs for power saving in order to make a drivable time using power from (its own) battery as long as possible. For this reason, a mechanism for reducing power consumption as possible as can is required to support the foregoing sleep-and-charge function.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 4 is an exemplary second view to explain a detailed circuit configuration related to a sleep-and-charge function of an information processing apparatus according to an embodiment.

FIG. 5 is an exemplary third view to explain a detailed circuit configuration related to a sleep-and-charge function of an information processing apparatus according to an embodiment.

FIG. 6 is an exemplary table showing signals and power sates of circuits related to a sleep-and-charge function for each state (ACPI "S0", "S3", "S4", "S5") in an information processing apparatus according to an embodiment.

DETAILED DESCRIPTION

Various embodiments will be described hereinafter with reference to the accompanying drawings.

In general, according to one embodiment, an information processing apparatus includes a connector, a device controller, a power supply controller, an operation mode switching circuit, a line switch, and a controller. The connector is configured to detachably connect an external device, which conducts a power supply line and a data line between a main body of the information processing apparatus and the external device. The device controller is configured to perform transmission with the external device through the data line, which includes a wakeup function of returning the main body to a power-on state when receiving a wakeup signal from the external device through the data line while the main body is in a standby state. The power supply controller is configured to control a supply of power to the external device through the power supply line. The operation mode switching circuit is configured to change an operation mode of a sleep-and-charge function, and to perform transmission with the external device through the data line in accordance with settings of the main body when the sleep-and-charge function is operated. The sleep-and-charge function supplies power to the external device regardless of the standby state, a hibernation state or a shutdown state of the main body. The line switch is configured to selectively connect the data line with either of the device controller or the operation mode switching circuit. The controller is configured to control a power supply to the device controller and a drive of the power supply controller, the operation mode switching circuit and the line switch in accordance with (i) whether or not the wakeup function is effective, (ii) whether or not the sleep-and-charge function is effective and (iii) whether or not the main body is in either of a power-on state, the standby state, the hibernation state or the shutdown state.

Figure 1:
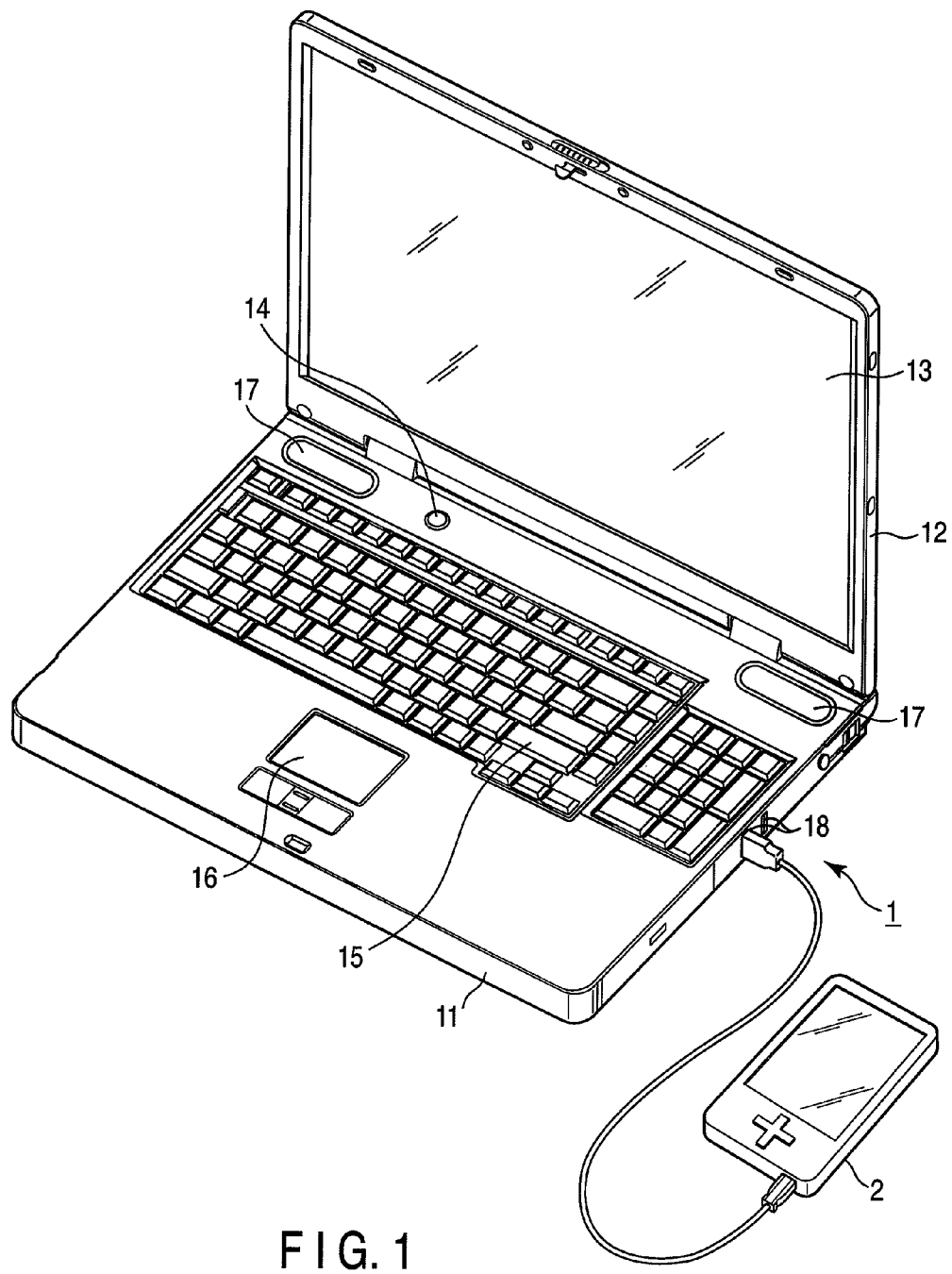
FIG. 1 is an exemplary perspective view showing the appearance of an information processing apparatus according to an embodiment.

FIG. 1 is an exemplary perspective view showing the appearance of an information processing apparatus according to the embodiment. The information processing apparatus is realized as a notebook personal computer 1.

As can be seen from FIG. 1, the foregoing computer 1 includes a computer body 11 and a display unit 12. The display unit 12 is incorporated with a liquid crystal display (LCD) 13. This display unit 12 is rotatably attached to the computer body 11 between the following positions. One is an opened position of a state that the upper surface of the computer body 11 is exposed. The other is a closed position of a state that the upper surface of the computer body 11 is covered with the display unit 12.

The computer body 11 has a thin-box body, and its upper surface is provided with a power button 14, a keyboard 15, a pointing device 16 and a loudspeaker 17. The side of the thin-box body is provided with an external USB port 18, which is capable of freely removing and connecting USB devices 2 such as a mobile music player and a mobile phone.

A USB device 2 connected to the foregoing external USB port 18 is operable by power from the computer 1. Further, a battery built into the USB device 2 is chargeable by power from the computer 1. Moreover, the computer 1 includes a sleep-and-charge function of always supplying power to a USB device 2 connected to the foregoing external USB port 18 even when the computer 1 is in a power-off state. This computer 1 includes a mechanism for reducing power consumption as possible as can to support the foregoing sleep-and-charge function, and thus, the mechanism will be detailedly explained below.

In this case, the computer 1 further includes a wakeup function of automatically returning to a power-on state when receiving a wakeup signal from a USB device 2 connected to the external USB port 18 in a standby state.

Figure 2:
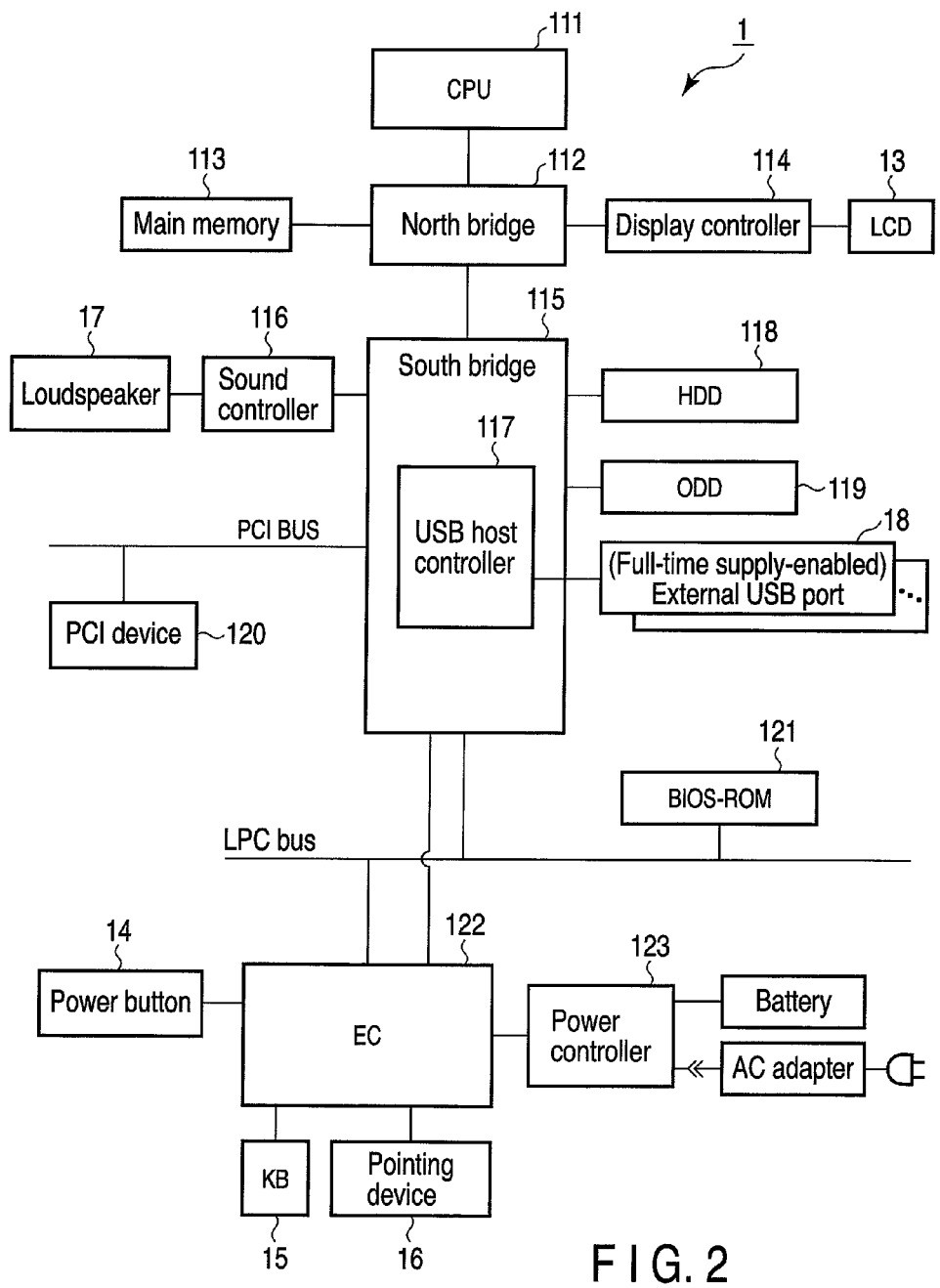
FIG. 2 is an exemplary block diagram schematically showing a system configuration of an information processing apparatus according to an embodiment.

FIG. 2 is an exemplary block diagram schematically showing the system configuration of this computer 1.

As shown in FIG. 2, the computer 1 includes a central processing unit (CPU) 111, a north bridge 112, a main memory 113, a display controller 114, a south bridge 115 and a sound controller 116. Further, the computer 1 includes a USB host controller 117 (built into the south bridge 115), a HDD 118, an optical disc drive (ODD) 119, a PCI device 120, a BIOS-ROM 121, an embedded controller (EC) 122 and a power-supply controller 123.

The CPU 111 is a processor for controlling the operation of each component of the computer 1. The CPU 111 executes an operating system, various application programs and a utility program, which are loaded from HDD 118 or ODD 119 to the main memory 113. Further, the CPU 111 executes a Basic Input/Output System (BIOS) stored in the BIOS-ROM 121. The foregoing BIOS is a program used for controlling hardware.

The north bridge 112 is a bridge device for making a connection between a local bus of the CPU 111 and the south bridge 115. The north bridge 112 includes a function of performing a communication with the display controller 114 by means of a Peripheral Component Interconnect (PCI) Express bus. Further, the north bridge 112 includes a built-in memory controller for controlling the main memory 113.

The display controller 114 controls the LCD 13 used for a display device of the computer 1. The display controller 114 includes a drawing function, and thus, functions as a graphic accelerator. The south bridge 115 is connected to each of a PCI bus and a Low Pin Count (LPC) bus. The foregoing PCI bus is connected with the PCI device 120 such as a PC card controller. On the other hand, the foregoing LPC bus is connected with the BIOS-ROM 121 and the EC 122. Moreover, the south bridge 115 includes a function of performing a communication with the sound controller 116. The sound controller 116 is a sound-source device, and outputs audio data, which is given as a reproduction target by various programs, to the loudspeaker 17.

The USB host controller 117 built into the south bridge 115 functions a controller for performing a communication with a USB device 2 connected to the USB port 18 using a data line derived by means of the external USB port 18.

The EC 122 is a one-chip microcomputer for executing power management, and includes a processor, a memory and various control logic. The EC 122 includes a built-in keyboard controller for controlling the keyboard (KB) 15 and the pointing device 16, which are arranged on the upper surface of the computer body 11 of the computer 1.

Furthermore, the EC 122 is associated with the power-supply controller 123 to execute the control of the power-on/off of the computer 1 in accordance with the operation by the power button 14. The power-supply controller 123 controls a generation of a system power supply to be supplied to each component of the computer 1 using power from a battery received in the computer body 11 or using power from an external power supply supplied by means of an alternating current (AC) adapter.

The foregoing wakeup function is realized in such a manner that the USB host controller 117 receiving a wakeup signal from a USB device 2 connected to the external USB port 18 supplies an event signal to the EC 122 by means of the south bridge 115.

The detailed circuit configuration related to a sleep-and-charge function of the computer 1 will be explained below with reference to FIG. 3, FIG. 4 and FIG. 5. In the following description, the sleep-and-charge function may be called as "full-time supply".

Figure 3:
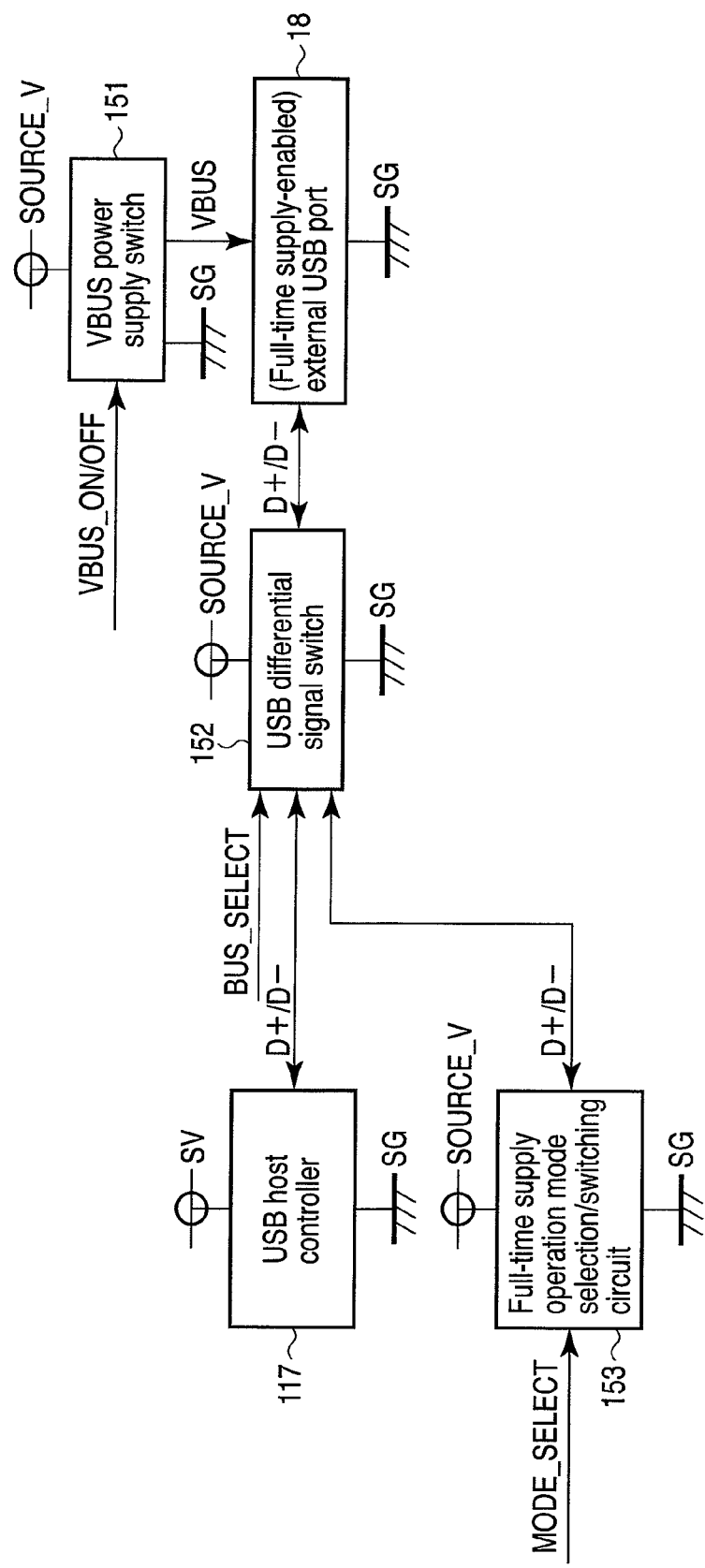
FIG. 3 is an exemplary first view to explain a detailed circuit configuration related to a sleep-and-charge function of an information processing apparatus according to an embodiment.

In FIG. 3, a VBUS power-supply switch 151 is a circuit for supplying power (i.e., "VBUS" described later) to the external USB port 18, and in addition, includes a state monitoring function for the purpose of protecting an over current. A USB differential signal switch 152 is a switch circuit, which selects a connection destination of a data line ("D+/D−" described later) of the external USB port 18 from the USB host controller 117 or a full-time supply operation mode selection/switching circuit 153 to change a connection path. The full-time supply operation mode selection/switching circuit 153 includes a single or plurality of circuit configurations for determining a full-time supply operation mode, and is a circuit for selecting and changing these configurations. The foregoing circuit 153 gives a notification of each operation mode to the USB device 2. In FIG. 5, a FET switch 154 is a FET switch for turning on/off the supply of power (i.e., "SV" described later) to the USB host controller 117, or is a circuit equivalent to the FET switch.

In FIG. 3, FIG. 4 and FIG. 5, symbols "SG", "SOURCE_V", "SV", "EV", "VBUS", "D+/D−", "SV_ON/OFF", "VBUS_ON/OFF", "BUS_SELECT" and "MODE_SELECT" show the following power-supplies and signals.

(a) "SG" (ground): Signal ground
(b) "SOURCE_V" (power supply): power supply given as the supply source to "SV" power supply
(c) "SV" (power supply): suspend power supply and power supply similar thereto
(d) "EV" (power supply): power supply to EC 122 and power supply similar thereto
(e) "VBUS" (power supply): power supply to external USB port
(f) "D+/D−" (signal): USB differential signal
(g) "SV_ON/OFF" (signal): control signal output from EC 122, and for turning on/off FET switch 154
(h) "VBUS_ON/OFF" (signal): control signal output from EC 122, and for turning on/off VBUS power-supply switch 151
(i) "BUS_SELECT" (signal): control signal output from EC 122, and for a signal connection path change of USB differential signal switch 152
(j) "MODE_SELECT" (signal): control signal output from EC 122, and for selecting an operation mode of full-time differential signal switch 152

As is evident from FIG. 3, the sleep-and-charge (full-time supply) function by the external USB port 18 and the wakeup function by the same port 18 have the converged relationship in its use. Namely, in the USB port 18, the following communications are carried out; one is a communication carried out between the full-time supply operation mode selection/switching circuit 153 and the USB device 2, and the other is a communication carried out between the USB host controller 117 and the USB device 2. For this reason, basically, these communications must be exclusively controlled. However, detection items such as "connect", "disconnect" and "over current" are removed from setting conditions of the wakeup function, and thereby, the foregoing two functions are usable in common.

Considering the foregoing point, a conventional circuit configuration related to an external USB port 18 will be explained below in order to help the understanding of the mechanism included in the computer 1.

According to the conventional circuit related to an external USB port 18, "SOURCE_V" and "SV" shown in FIG. 3 are configured as the same system power supply. For this reason, the FET switch 154 shown in FIG. 5 has no need; therefore, it does not exist therein. Moreover, according to the case, where is not adaptable to the sleep-and-charge (full-time supply) function given as the features of the invention, USB differential signal switch 152 and full-time supply operation mode selection/switching circuit 153 shown in FIG. 3 have no need; therefore, they do not exist therein. In this case, the external USB port 18 is directly connected with the USB host controller 117.

Although there is no special illustration in FIG. 3, the following consideration is taken with respect to an over current of the external USB port 18 whose state is monitored by the VBUS power supply switch 151. Namely, a signal for informing the generation of the over current is connected to the EC 122. In this way, even if the computer 1 is in a standby state, a hibernation state, a power-off state ("S3"/"S4"/"S5" of ACPI) or a state similar thereto, it is possible to easily build up a protection function contributing to securing the safety by means of "VBUS_ON/OFF".

A circuit related to the external USB port 18 of the computer 1 differs from the foregoing conventional circuit related to the external USB port 18 in the following point. First, in order to provide a sleep-and-charge (full-time supply) function by the external USB port 18, the circuit is provided with a USB differential signal switch 152 and a full-time supply operation mode selection/switching circuit 153, which are shown in FIG. 3.

Further, the circuit is additionally provided with the FET switch 154 shown in FIG. 5. In this way, as can be seen from FIG. 5, "SV" is separated from "SOURCE_V" so that "SV" is supplied to the USB host controller 117.

FIG. 6 is an exemplary table showing each signal and a state of each power supply of a circuit related to a sleep-and-charge function for each state (ACPI "S0", "S3", "S4", "S5") of the computer 1. The remark columns (1) to (10) shown in FIG. 6 mean the following:

(1) ACPI "S0" (Normal use of computer 1)
Normal operation when each power supply of "SV", "VBUS", "SOURCE_V" and "EV" basically all turns on
(2) ACPI "S3" (Full-time supply: OFF/Wakeup: OFF)
"S3" (standby state) normal operation of computer 1
(3) ACPI "S4" (Full-time supply: OFF/Wakeup: OFF)
"S4" (hibernation state) normal operation of computer
(4) ACPI "S5" (Full-time supply: OFF/Wakeup: OFF)
"S5" (shutdown state) normal operation of computer 1
(5) ACPI "S3" (Full-time supply: OFF/Wakeup: ON)
USB wakeup waiting operation of the foregoing (2)
(6) ACPI "S4" (Full-time supply: OFF/Wakeup: ON)
USB wakeup waiting operation of the foregoing (3)
(7) ACPI "S3" (Full-time supply: ON/Wakeup: OFF)
"S3" (standby state) full-time supply operation of computer 1
(8) ACPI "S4" (Full-time supply: ON/Wakeup: OFF)
"S4" (hibernation state) full-time supply operation of computer 1
(9) ACPI "S5" (Full-time supply: ON/Wakeup: OFF)
"S5" (shutdown state) full-time supply operation of computer 1
(10) ACPI "S5" (Full-time supply: OFF/Wakeup: ON)
USB wakeup waiting operation (basically, non-support) of the foregoing (4)

As shown in the foregoing remark columns (8) and (9) of FIG. 6, "SV" is separated from "SOURCE_V" by means of the FET switch 154 as described above so that "SV" is supplied to the USB host controller 117. As a result, even if the computer 1 is in a hibernation state or in a shutdown state, according to the combination condition of "Full-time supply: ON" and "Wakeup: OFF", a supply source to the USB host controller 117, that is, "SV" is turned off so that a full-time supply function is provided. Moreover, according to the conventional circuit configuration related to the external USB port 18, even if the foregoing condition is given, the supply to the USB host controller 117 is continued; therefore, power save can be achieved.

As can be seen from FIG. 4, the EC 122 controls signals "SV_ON/OFF", "VBUS_ON/OFF", "BUS_SELECT" and "MODE_SELECT". In this way, even if the computer 1 is in a standby state, a hibernation state, a power-off state ("S3"/"S4"/"S5" of ACPI) or in a state similar thereto. A protection function contributing to securing safety is operated, and in addition, a full-time supply function by the external USB port 18 is provided.

Although no special explanation is given here, of course, BIOS or firmware similar thereto set the foregoing control conditions, and perform a function of preparing an operating environment during the state shown in the remark column (1) of FIG. 6.

Therefore, the computer 1 can achieve further power saving when supporting the sleep-and-charge (full-time supply) function. This is because, as can be seen from the foregoing description, the computer 1 includes the following circuit configuration. Namely, the computer 1 is provided with the FET switch 154. This FET switch 154 separates a suspend power supply ("SV") to the USB host controller 117 from a power supply ("SOURCE_V") to VBUS power supply switch 151, USB differential signal switch 152 and full-time supply operation mode selection/switching circuit 153. The foregoing switches and circuit are required to realize the sleep-and-charge (full-time supply) function. Further, these switches and circuit are controlled by the EC 122.

FIG. 3 shows an example in which the foregoing USB differential signal switch 152, USB host controller 117 and full-time supply operation mode selection/switching circuit 153 are provided independently from each other. In this case, the following configuration is also usable; namely, the USB differential signal switch 152 (inputting "SOURCE_V" and the full-time supply operation mode selection/switching circuit 153 may be integrally configured. Moreover, two-system input paths such as "SV" and "SOURCE_V" are provided, and thereby, this serves to provide the following configurations. Specifically, the configurations are as follows:

(i) Configuration of integrating the USB differential signal switch 152 with the USB host controller 117;

(ii) Configuration of integrating the full-time supply operation mode selection/switching circuit 153 with the USB host controller 117; and (iii) Configuration of integrating the USB differential signal switch 152 with the full-time supply operation mode selection/switching circuit 153.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a connector configured to detachably connect an external device, the connector conducting a power supply line and a data line between a main body of the information processing apparatus and the external device;
a device controller configured to perform transmission with the external device through the data line, the device controller comprising a wakeup function of returning the main body to a power-on state when receiving a wakeup signal from the external device through the data line while the main body is in a standby state;
a power supply controller configured to control power supply to the external device through the power supply line;
an operation mode switching circuit configured to change an operation mode of a sleep-and-charge function, and to perform transmission with the external device through the data line in accordance with settings of the main body when the sleep-and-charge function is operated, the sleep-and-charge function supplying power to the external device regardless of the standby state, a hibernation state, or a shutdown state of the main body;
a line switch configured to selectively connect the data line with either the device controller or the operation mode switching circuit;
a power supply switch configured to disconnect a power supply line to the device controller from a power supply line to the power supply controller, the operation mode switching circuit and the line switch, and to perform power supply to the device controller or cut off the power supply to the device controller; and
a controller configured to control the power supply switch in order to cut off the power supply to the device controller and control the line switch in order to connect the data line to the operation mode switching circuit, when the sleep-and-charge function is effective and the main body is either in the hibernation state or in the shutdown state.

2. The apparatus of claim 1, wherein the controller is further configured to control the power supply switch in order to perform the power supply to the device controller and control the line switch in order to connect the data line to the device controller, when the wakeup function is effective.

3. The apparatus of claim 1, wherein the operation mode switching circuit and the line switch are configured in one integrated circuit.

4. The apparatus of claim 1, wherein the device controller and the line switch are configured in one integrated circuit comprising at least two system power supply lines, and the device controller and the line switch are configured to receive power through different ones of the system power supply lines, respectively.

5. The apparatus of claim 1, wherein the device controller and the operation mode switching circuit are configured in one integrated circuit comprising at least two system power supply lines, and the device controller and the operation mode switching circuit are configured to receive power through different ones of the system power supply lines, respectively.

* * * * *